Aug. 3, 1937.                E. M. SIMS                2,089,103
                              WELDING
                        Filed April 17, 1935
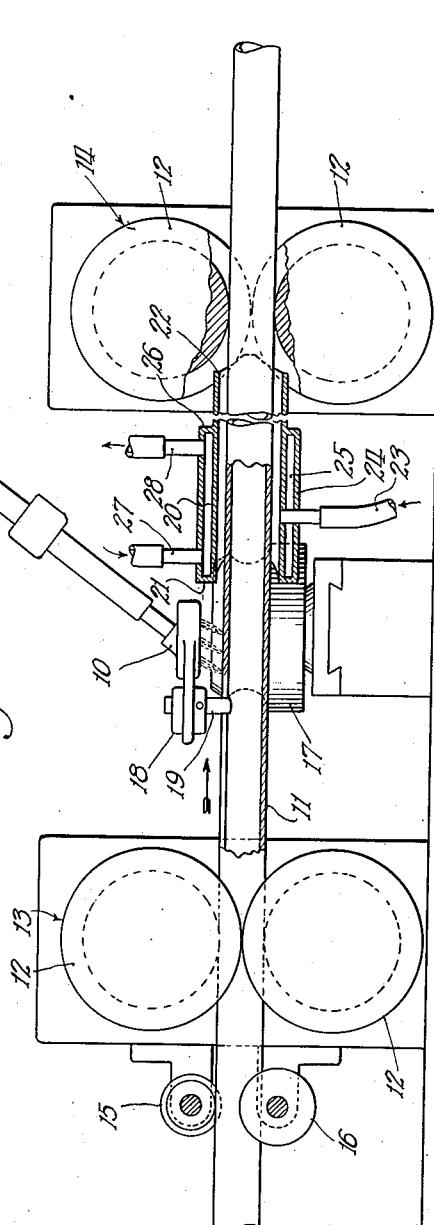
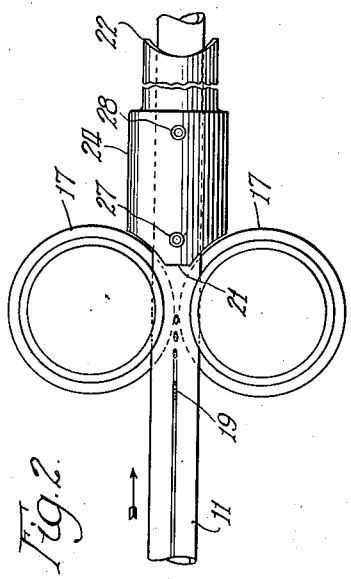
Inventor
Ernest M. Sims
By: Roland C. Rehm
                Atty.

Patented Aug. 3, 1937

2,089,103

UNITED STATES PATENT OFFICE 2,089,103

WELDING

Ernest M. Sims, Elkhart, Ind.

Application April 17, 1935, Serial No. 16,833

9 Claims. (Cl. 113—112)

This invention relates to the welding of tubing and the like, and particularly to welding by methods such as gas wherein the high temperatures developed result in relatively heavy scaling or oxidation of the metal. Notwithstanding such objection, welding by these methods produces a superior weld (probably because the metal is actually melted instead of being rendered merely plastic), and, among other objects, the present invention aims to reduce oxidation or the formation of scale, and otherwise to improve the manufacture of welded tubes and the like.

The nature of the invention may be readily understood by a reference to one embodiment thereof illustrated in the accompanying drawing.

In said drawing:

Fig. 1 is a longitudinal elevation, somewhat diagrammatic in character of improved apparatus for welding tube according to the present invention; and Fig. 2 is a plan view of that portion of the apparatus in the region of the welding point.

Most metals oxidize rapidly when hot, and in welding processes in which a substantial portion of the metal is heated to high temperatures, oxidation is so rapid that heavy scaling results. As regards welded tubing (particularly steel tubing), which is subjected to finishing or other treatment after welding, the presence of scale is objectionable. For example, if the welded tubing bearing the scale be sized in a swaging operation, the particles of scale are pounded into the tube, thus objectionably pitting its surface and making it difficult or impossible to give the tube a smooth finish. Heretofore, in such cases, it has been necessary to subject the tube to an expensive grinding or other scale-removing process before swaging or subsequent treatment. This resulted in increasing the cost of production to a level where the tube could not readily be sold in competition with other tubing whose production did not result in the formation of heavy or extensive scale, although it might otherwise be inferior.

The invention is here shown embodied in a process and apparatus for butt welding tubing. Welding heat is in this instance supplied by a multiple jet oxyacetylene torch 10 which is preferably adjustable both laterally and toward and away from the tube. In the present instance, the welding heat is caused to traverse the seam to be welded by feeding the tube 11 preferably at a uniform rate past the welding heat. The feeding means are here shown in the form of sets of grooved feeding rolls 12 placed in advance and beyond the welding point and driven synchronously and at a uniform rate by appropriate driving means, the details of which are well known in the art and need not therefore be described. The grooved contour of the rolls is preferably such that each pair of rolls substantially completely embraces or surrounds the tube, thus preventing distortion thereof in the exertion of feeding pressures.

Generally, the tube is made from a flat ribbon or strip of metal which is gradually transversely curved until it possesses the desired contour (circular or otherwise) and the edges of the tube are brought approximately together. Thereupon, the tube (generally cut to appropriate lengths) is introduced between the leading pair 13 of feeding rolls, and advanced thereby to welding position, and thence through the trailing pair 14 of rolls. The seam to be welded is held in alignment with the welding torch by a guide roll blade 15 whose thin edge enters between the seam cleft and prevents the seam from twisting out of alignment with the welding torch. A supporting guide roll 16 is preferably associated with the guide roll 15. If the edges of the metal at the seam are not in accurate welding proximity, it is preferable to apply pressure to the tube at the welding point, so as to bring the edges of the metal into proper welding relationship. This is effected, in this instance, by passing the tube between a pair of grooved pressure or side rolls 17 (preferably water cooled) whose combined contour is such as to press the edges of the metal together sufficiently to insure a good weld, though not to exert enough pressure to upset the metal excessively at the welding point and produce a substantial interior or exterior fin at the weld seam. The side rolls 17 are preferably laterally movable relative to the tube so that the pressure exerted at the seam may be adjusted to the proper amount. These rolls are old and well known and their details need not be further described. Such rolls may advantageously be omitted if the tube be initially formed with the edges of the metal at the seam cleft in proper welding proximity. Small diameter tubing particularly can be thus welded to advantage, since the absence of such pressure practically eliminates any internal or external fin or upset at the weld seam.

While the welding torch 10 is here shown with three jets, it will be understood that the number, size and character of jets may be varied in accordance with the metal to be welded. The torch is preferably guided by a guide block 18 carrying a blade 19 which follows the seam opening and holds the flame tips in accurate alignment with the seam, thus avoiding weakness in the weld which might develop through slight misalignment of the flame tip or tips with the seam.

Immediately after the tube is brought to welding heat, it is protected against oxidation until it has cooled to a point below that at which substantial oxidation or formation of scale occurs. In the present instance, access of oxygen to the tube is prevented by enclosing the tube with a shield 20, in this instance tubular in contour, which extends from the welding point to the trailing pair of feed rolls, at which point the tube has cooled below the point where objectionable oxidation can take place. As here shown (Figs. 1 and 2), the leading end 21 of the shield is shaped to fit closely to the contour of the side rolls 17 and therefore envelops the tube immediately after it leaves the bight of the side rolls. In fact, since the atmosphere of the torch itself is non-oxidizing (i. e. neutral) if it is not actually reducing, the tube is protected against access of oxygen from the time it enters the heating zone until it subsequently cools below the rapidly oxidizing temperature. In this instance, the trailing end 22 of the tube is also shaped so as to approach closely to the trailing set of feed rolls 14. Thus the tube is enveloped until it leaves the trailing feed rolls, which themselves have a cooling effect on the tube.

The atmosphere inside the enveloping shield is maintained in a non-oxidizing condition by introduction of an appropriate gas therein, and preferably a gas which has a reducing action such as hydrogen. As here shown, the hydrogen or other gas is introduced from below, i. e., opposite the weld through the pipe 23, in such volume as to prevent the leakage of oxygen into the tube at the ends. The hydrogen may advantageously be supplied from a tank (not shown) which is provided with a control valve by which the rate of supply may be regulated. If any oxygen should enter the tube (which would not ordinarily happen), it would immediately combine by preference with the hydrogen and the atmosphere in the shield would remain non-oxidizing or reducing. The weld seam emerges from the trailing feeding rolls in a bright and clean condition, or at least so slightly discolored by an oxide film that for all purposes the weld may be said to be practically free of any scale or oxide film.

To prevent undue heating of the leading end of the shield and incidentally to assist in the cooling of the tube as it passes through the non-oxidizing or reducing atmosphere, the shield is preferably water-jacketed. Such a jacket is here shown provided by a tube 24 substantially larger than the shield 20 so as to provide a water jacket space 25. It is closed at its ends 26 and cooling water enters through the pipe 27 and leaves through the pipe 28.

For reasons which are not fully understood, the cooling of the weld in the reducing atmosphere effects a marked improvement on the weld seam itself aside from preventing oxidation. The external and internal fins or ridges are much less prominent, the improvement being particularly noticeable in a marked reduction in the width of the fins or ridges of upset metal.

Following delivery from the welding machine, the tube may then be immediately swaged to size the same, or for other purposes without intervening treatment. Grinding and cleaning costs as regards scale removal are therefore wholly eliminated and the cost of manufacture so substantially reduced as to make it possible to provide a tube with a superior weld at no greater price than tubes now on the market. It will be understood that for plating or the like all kinds of tubes are smoothed or polished up to provide the superior smooth finish expected of plated tubing.

Obviously the invention is not limited to the details of the illustrative construction since these may be variously modified. Moreover, it is not indispensable that all features of the invention be used conjointly since various features may be used to advantage in different combinations and subcombinations.

Having described my invention, I claim:

1. The method of improving the surface of welded tubes which is characterized by passing the seam cleft of a tube past a welding heat to bring the metal adjacent the seam cleft to welding temperatures, subjecting the welded seam immediately to the action of a reducing atmosphere while it cools, and then without intervening treatment, swaging the tube surface to bring the tube to a predetermined diameter.

2. The method of welding longitudinal seams in tubing which is characterized by passing the tube to be welded under a welding jet at a rate sufficient to bring the metal adjacent the seam cleft to the molten condition for welding and at the same time guiding the seam with reference to the welding jet to effect exact alignment between the jet and the seam and immediately after the welded seam passes the welding jet, passing the same through a shield which envelops the tube until it has cooled below temperatures at which rapid oxidation takes place, introducing hydrogen into said shield at a point opposite the weld seam in quantities sufficient to maintain an atmosphere of hydrogen around the seam, and applying cooling water to said shield.

3. The method of butt welding tubing and the like by a gas flame which is characterized by moving the seam cleft under an oxyacetylene welding flame of a non-oxidizing character at a rate to bring the metal at the seam cleft to fusion temperatures, bringing the edges of the seam cleft into welding proximity, and immediately thereafter passing the tube through a shield which envelops said tube until it has cooled, introducing hydrogen into said shield at a point opposite the weld in quantities sufficient to maintain an atmosphere of hydrogen around said tube, and applying cooling water to said shield.

4. Apparatus for forming butt-seam tubing and the like comprising in combination a welding jet, feeding rolls for feeding the tube past the welding jet, a guide entering the seam cleft in advance of the jet and connected to the latter so as to cause it to move laterally with lateral movements of the seam cleft and thereby to maintain perfect alignment of the jet and seam cleft at the welding point, a shield surrounding the tube from a point just beyond the welding point to a point at which the tube has cooled below temperatures at which rapid oxidation takes place, and a conduit connected to said shield at a point opposite the weld seam for introducing a non-oxidizing gas into said shield to treat the weld seam as it cools.

5. The method of reducing the width of the external weld fin on butt welded tubing which is characterized by moving the seam cleft past a source of heat at a rate to bring the edges of the seam cleft to welding temperatures and simultaneously pressing the edges of the seam cleft together to hold them in welding contact, and before the welded seam has passed beyond the heating effect of said source of heat surrounding said welded seam with a reducing atmosphere which acts to confine the metal upset at the seam into a relatively narrow fin, and maintaining said surrounding reducing atmosphere until the weld seam has substantially cooled.

6. Apparatus for butt welding tubing comprising in combination a source of welding heat, means for feeding the seam cleft of a tube past the welding heat, pressure rolls engaging the tube adjacent the welding heat at the point where the edges of the seam cleft are brought to welding temperature, and a shield at said pressure rolls for surrounding said tube immediately as it leaves said rolls and before it has moved beyond the heating effect of the welding heat and means for introducing a reducing gas into said shield to maintain a reducing atmosphere around said tube until the weld seam has substantially cooled.

7. The method of reducing the width of the external weld fin on butt welded tubing which is characterized by moving the seam cleft past a source of heat at a rate to bring the edges of the seam cleft to welding temperatures and simultaneously pressing the edges of the seam cleft together to hold them in welding contact, and before the welded seam has passed beyond the heating effect of said source of heat surrounding said welded seam with a reducing atmosphere which acts to confine the metal upset at the seam into a relatively narrow fin, maintaining said surrounding reducing atmosphere until the weld seam has substantially cooled, and then directly finishing said tube by obliterating the external narrow fin at the weld seam.

8. The method of reducing the width of the external weld fin on butt welded tubing which is characterized by moving the seam cleft past an oxy-acetylene welding jet at a rate to bring the edges of the seam cleft to welding temperatures and simultaneously pressing the edges of the seam cleft together to hold them in welding contact, and before the welded seam has passed beyond the heating effect of said oxy-acetylene jet surrounding said welded seam with a reducing atmosphere which acts to confine the metal upset at the seam into a relatively narrow fin, and maintaining said surrounding reducing atmosphere until the weld seam has substantially cooled.

9. Apparatus for butt welding tubing comprising in combination a source of welding heat, means for feeding the seam cleft of a tube past the welding heat, pressure rolls engaging the tube adjacent the welding heat at the point where the edges of the seam cleft are brought to welding temperature, and a cylindrical shield surrounding said tube and being cut away on opposite sides to accommodate portions of said pressure rolls and to permit the tube to extend partly between said pressure rolls in a direction toward the source of welding heat to receive the tube before it has moved beyond the heating effect of the welding heat, and means for introducing a reducing gas into said shield to maintain a reducing atmosphere around said tube until the weld seam has substantially cooled.

ERNEST M. SIMS.